United States Patent
Koito et al.

(10) Patent No.: US 8,531,632 B2
(45) Date of Patent: *Sep. 10, 2013

(54) METHOD OF MANUFACTURING A DISPLAY DEVICE WITH TRANSMISSIVE AND REFLECTIVE REGIONS

(75) Inventors: Takeo Koito, Kanagawa (JP); Yoshihiro Kanno, Kanagawa (JP); Morikazu Nomura, Kyoto (JP)

(73) Assignee: Japan Display West Inc., Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,559

(22) Filed: Apr. 6, 2012

(65) Prior Publication Data
US 2012/0196031 A1     Aug. 2, 2012

Related U.S. Application Data

(62) Division of application No. 11/948,303, filed on Nov. 30, 2007, now Pat. No. 8,189,145.

(30) Foreign Application Priority Data

Dec. 20, 2006  (JP) ................................ 2006-342141

(51) Int. Cl.
G02F 1/13     (2006.01)
G02F 1/1335   (2006.01)
G02F 1/1333   (2006.01)

(52) U.S. Cl.
USPC ........................... 349/114; 349/187; 349/138

(58) Field of Classification Search
USPC ........................................ 349/114, 138, 187
See application file for complete search history.

(56) References Cited

U.S. PATENT DOCUMENTS

| 8,189,145 B2 * | 5/2012 | Koito et al. ................... 349/114 |
| 2004/0041957 A1 | 3/2004 | Yamaguchi et al. |
| 2006/0007102 A1 | 1/2006 | Yasuoka et al. |
| 2006/0125986 A1 | 6/2006 | Choo et al. |
| 2006/0181661 A1 | 8/2006 | Kudou et al. |
| 2006/0256265 A1 | 11/2006 | Rho et al. |
| 2008/0043184 A1 | 2/2008 | Tung et al. |
| 2008/0151174 A1 | 6/2008 | Koito et al. |

FOREIGN PATENT DOCUMENTS

| JP | 2001-166289 | 6/2001 |
| JP | 2001-272674 | 10/2001 |
| JP | 2001-318377 | 11/2001 |
| JP | 2001-350158 | 12/2001 |
| JP | 2003-156756 | 5/2003 |
| JP | 2004-361598 | 12/2004 |
| JP | 2005-037556 | 2/2005 |
| JP | 2005-115315 | 4/2005 |

(Continued)

*Primary Examiner* — Richard Kim
*Assistant Examiner* — Michael Inadomi
(74) *Attorney, Agent, or Firm* — Dentons US LLP (57) ABSTRACT

A display device formed by plural pixels that have reflective regions and transmissive regions is disclosed. The display device includes, in each of the pixels: an element layer formed on a substrate; a planarizing layer formed on the substrate to cover the element layer; and a gap adjusting layer formed on the planarizing layer on the element layer. In the display device, the reflective region is formed by an area including the element layer, the planarizing layer, the gap adjusting layer, and a reflection electrode formed on the gap adjusting layer, and the transmissive region is formed by an area including the planarizing layer formed on the substrate excluding an area in which the gap adjusting layer is formed.

2 Claims, 10 Drawing Sheets

(56) References Cited

FOREIGN PATENT DOCUMENTS

| JP | 2005-345581 | 12/2005 |
| JP | 2006-039111 | 2/2006 |
| JP | 2006-221055 | 8/2006 |
| JP | 2006-323385 | 11/2006 |
| JP | 2007-071936 | 3/2007 |

* cited by examiner

FIG. 1A

SIGNAL LINE          SIGNAL LINE

METHOD OF MANUFACTURING A DISPLAY DEVICE WITH TRANSMISSIVE AND REFLECTIVE REGIONS

RELATED APPLICATION DATA

This application is a division of U.S. patent application Ser. No. 11/948,303, filed Nov. 30, 2007, the entirety of which is incorporated herein by reference to the extent permitted by law. This application claims the benefit of priority to Japanese Patent Application No. JP 2006-342141 filed in the Japanese Patent Office on Dec. 20, 2006, the entirely of which is incorporated herein by reference to the extent permitted by law.

BACKGROUND OF THE INVENTION

1. Field of the Invention

The present invention relates to a display device such as a liquid crystal display device and a method of manufacturing the same.

2. Description of the Related Art

In recent years, liquid crystal display devices are used as display devices for various electronic apparatuses such as a personal computer, a cellular phone, and a digital camera by virtue of advantages that the liquid crystal display devices are thin and consume less power. Such liquid crystal display devices are not self light-emitting display devices such as a CRT (Cathode Ray Tube) and an organic electroluminescence (organic EL) device and are roughly divided into a transmissive type and a reflective type.

A transmissive liquid crystal display device performs display using light of a lighting device (a back light) arranged behind a liquid crystal panel. A reflective liquid crystal display device performs display using ambient light. Since the transmissive liquid crystal display device performs display using light of the backlight, the transmissive liquid crystal display device has an advantage that, even if ambient light is weak, display at high luminance and contrast is possible without being affected by the light. However, since the backlight consumes almost a half of total power consumed by the transmissive liquid crystal display device, it is difficult to reduce power consumption. Moreover, when ambient light is strong, display looks dark and viewability is deteriorated.

On the other hand, since the reflective liquid crystal display device does not have a backlight, the reflective liquid crystal display device has an advantage that power consumption is extremely small. Thus, the reflective liquid crystal display device is effective as a display device carried to the outdoor. However, the reflective liquid crystal display device has a disadvantage that viewability is deteriorated in a dark environment of use.

In order to solve the problems of the transmissive liquid crystal display device and the reflective liquid crystal display device, a semi-transmissive (transflective) liquid crystal display device that uses both transmissive-type display and reflective-type display is proposed (see, for example, JP-A-2001-318377).

The semi-transmissive liquid crystal display device performs display using ambient light when the environment is bright and performs display using a backlight when the environment is dark. For improvement of the characteristics, when the semi-transmissive liquid crystal display device has both a reflective region and a transmissive region, the thickness of a liquid crystal layer of the transmissive region is designed to be about twice as large as the thickness of a liquid crystal layer of the reflective region.

As a kind of such a structure, a gap adjusting layer for adjusting the thickness of the liquid crystal layer of the reflective region is provided on a side where a color filter is formed. When the gap adjusting layer is provided, bonding of the color filer and a thin film transistor (hereinafter referred to as TFT) has to be taken into account to realize satisfactory characteristics. Thus, the reflective region is narrowed (see, for example, JP-A-2005-115315) and reflection characteristics are deteriorated.

When a mechanism for adjusting a gap is formed on the TFT side (see, for example, JP-A-2001-350158), the bonding with the color filter is improved. However, since the gap is adjusted by removing an insulating layer of the transmissive region, deterioration in a transmission quality due to roughness formed by signal lines or the like is caused. Moreover, since a contact hole is opened in an insulating layer below a reflection electrode, deterioration in the reflection characteristics is caused.

SUMMARY OF THE INVENTION

As described above, when the gap adjusting layer for adjusting the thickness of the liquid crystal layer of the reflective region is provided, a margin of bonding of the color filter and the thin film transistor (TFT) has to be taken into account to have excellent transmission characteristics. Thus, the reflective region is narrowed and the reflection characteristics are deteriorated.

Therefore, it is desirable to improve the reflection characteristics and the transmission characteristics.

According to an embodiment of the present invention, there is provided a display device formed by plural pixels that have reflective regions and transmissive regions. The display device includes, in each of the pixels, an element layer formed on a substrate, a planarizing layer formed on the substrate to cover the element layer, and a gap adjusting layer formed on the planarizing layer on the element layer. The reflective region is formed by an area including the element layer, the planarizing layer, the gap adjusting layer, and a reflection electrode connected to a pixel electrode at one end of the gap adjusting layer and formed on the gap adjusting layer. The transmissive region is formed by an area including the planarizing layer formed on the substrate excluding an area in which the gap adjusting layer is formed.

In the display device, since the reflective region includes the gap adjusting layer in which the reflection electrode is formed, the reflective region can suppress deterioration in reflection characteristics. Thus, it is possible to obtain a high reflectance. The transmissive region is formed by the area including the planarizing layer formed on the substrate. The element layer in which a driving transistor, signal lines, and the like are formed is provided in the reflective region. Therefore, since the transmissive region does not have items that block the transmission of light, such as signal lines, it is possible to realize a high transmission contrast ratio and a high transmittance.

According to another embodiment of the present invention, there is provided a method of manufacturing a display device including the steps of forming, on a substrate, a planarizing layer that covers an element layer formed on the substrate, forming, in the planarizing layer, a contact hole leading to the element layer, forming, in the planarizing layer, a pixel electrode connected to the element layer through the contact hole, forming a gap adjusting layer on the planarizing layer, and forming, on the gap adjusting layer, a reflection electrode connected to the pixel electrode at one end of the gap adjusting layer.

In the method of manufacturing the display device, since the gap adjusting layer in which the reflection electrode is formed is formed in a reflective region, the reflective region can suppress deterioration in reflection characteristics. Thus, it is possible to obtain a high reflectance. A transmissive region is formed by an area including the planarizing layer formed on the substrate. The planarizing layer is formed in the transmissive region. Therefore, since roughness that cause missing of light due to signal lines and the like are not formed in the transmissive region, it is possible to realize a high transmission contrast ratio and a high transmittance.

According to the embodiment of the present invention, since the reflective region can suppress deterioration in reflection characteristics, it is possible to realize a display device having a high reflectance. Since the surface of the transmissive region is formed flat by the planarizing layer, it is possible to realize a display device having a high transmission contrast ratio and a high reflectance. Since the reflection electrode is connected to the pixel electrode at one end of the gap adjusting layer, the contact hole connecting the reflection electrode and the pixel electrode is unnecessary. Therefore, the display device is excellent in reflection characteristics such as a reflectance and a contrast. Moreover, since the gap adjusting layer is formed on the side where the element layer is formed, a step is formed on the element layer side. Therefore, since a margin of bonding with the color filer is unnecessary, when the transmittance is the same, the display device is excellent in the reflection characteristics compared with the display device having the gap adjusting layer on the color filter side.

According to the still another embodiment of the present invention, since the reflective region can suppress deterioration in reflection characteristics, it is possible to realize a display device having a high reflectance. Since the surface of the transmissive region is formed flat by the planarizing layer, it is possible to realize a display device having a high transmission contrast ratio and a high reflectance. Since the reflection electrode is connected to the pixel electrode at one end of the gap adjusting layer, the contact hole connecting the reflection electrode and the pixel electrode is unnecessary. Therefore, the display device is excellent in reflection characteristics such as a reflectance and a contrast. Moreover, since the gap adjusting layer is formed on the side where the element layer is formed, a step is formed on the element layer side. Therefore, since a margin of bonding with the color filer is unnecessary, when the transmittance is the same, the display device is excellent in the reflection characteristics compared with the display device having the gap adjusting layer on the color filter side.

DESCRIPTION OF THE PREFERRED EMBODIMENTS

Figure 1A:
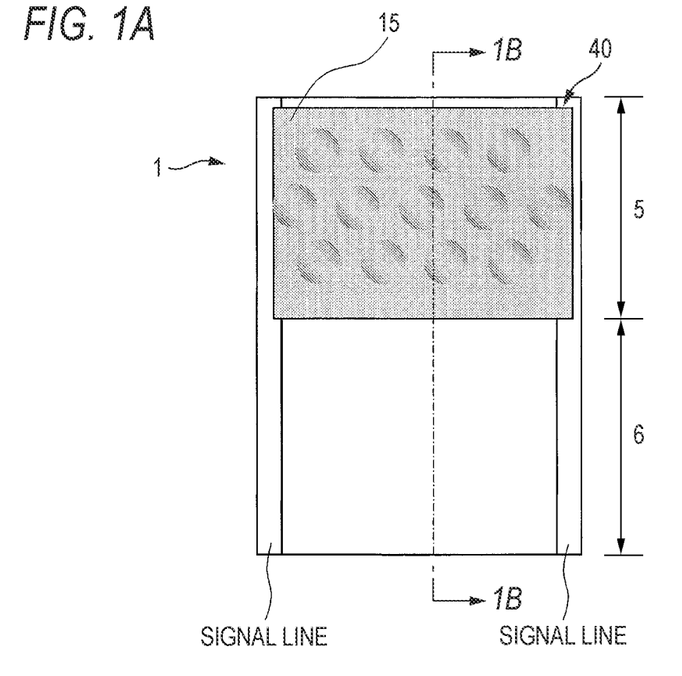
FIG. 1A is a plan view showing an element side substrate for one pixel of a liquid crystal cell of a liquid crystal display device according to a first embodiment of the present invention.
Figure 1B:
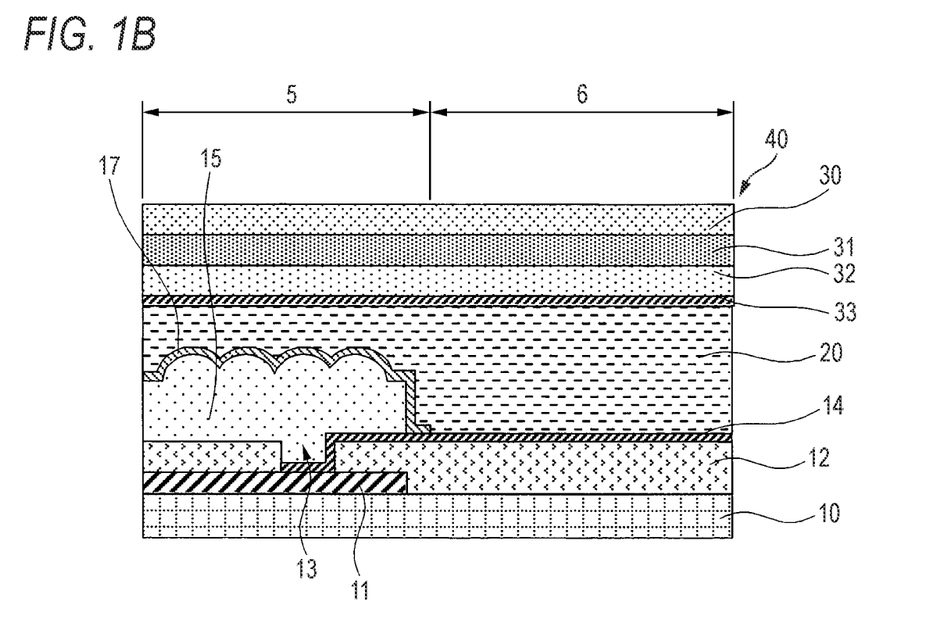
FIG. 1B is a sectional view taken along line A-A' in FIG. 1A.

A display device according to a first embodiment of the present invention is explained with reference to FIGS. 1A and 1B. FIG. 1A is a plan view showing an element side substrate for one pixel of a liquid crystal cell of a semi-transmissive liquid crystal display device as an example of the display device. FIG. 1B is a sectional view taken along line A-A' in FIG. 1A.

As shown in FIGS. 1A and 1B, a liquid crystal display device 1 is formed by plural pixels 40, in each of which a liquid crystal layer 20 is sealed between substrates 10 and 30 opposed to each other. Each of the pixels 40 has a reflective region 5 and a transmissive region 6 and displays an image. An element layer (including driving and control elements and signal lines) 11 is formed on the substrate 10. A planarizing layer 12 is formed on the substrate 10 to cover the element layer 11. A pixel electrode 14 connected to the element layer 11 through a contact hole 13 is formed on the planarizing layer 12 on the element layer 11. A gap adjusting layer 15 is formed on the pixel electrode 14 and above the element layer 11. An upper surface (on the liquid crystal layer 20 side) of the gap adjusting layer 15 is formed in an irregular shape and a reflection electrode 16 is formed thereon. The reflection electrode 16 is connected to the pixel electrode 14 at an end of the gap adjusting layer 15.

Therefore, the reflective region 5 is formed by an area including the element layer 11, the planarizing layer 12 that covers the element layer 11, the gap adjusting layer 15 formed on the planarizing layer 12 via a part of the pixel electrode 14, and the reflection electrode 16 formed on the gap adjusting layer 15. The transmissive region 6 is formed by an area including the planarizing layer 12 and the pixel electrode 14 formed on the substrate 10 excluding an area in which the gap adjusting layer 15 is formed.

On the other hand, a color filter 31 is formed on the substrate 30 that is an opposed substrate opposed to the substrate 10. A pixel electrode 33 is formed on the surface of the color filter 31 via a planarizing layer 32.

In the liquid crystal display device 1, the contact hole 13 between the element layer 11 and the pixel electrode 14 is covered by a lower part of the gap adjusting layer 15, i.e., covered by the gap adjusting layer 15. Thus, reflection characteristics of the reflective region 5 are improved. Although the pixel electrode 14 is formed on the surface of the transmissive region 6, since the thickness of the pixel electrode 14 is uniform, the transmissive region 6 has a form same as a form made flat by a planarizing layer. Thus, even if a light blocking member is not provided, there is no light leakage and a high transmission contrast ratio is obtained.

Figure 2A:
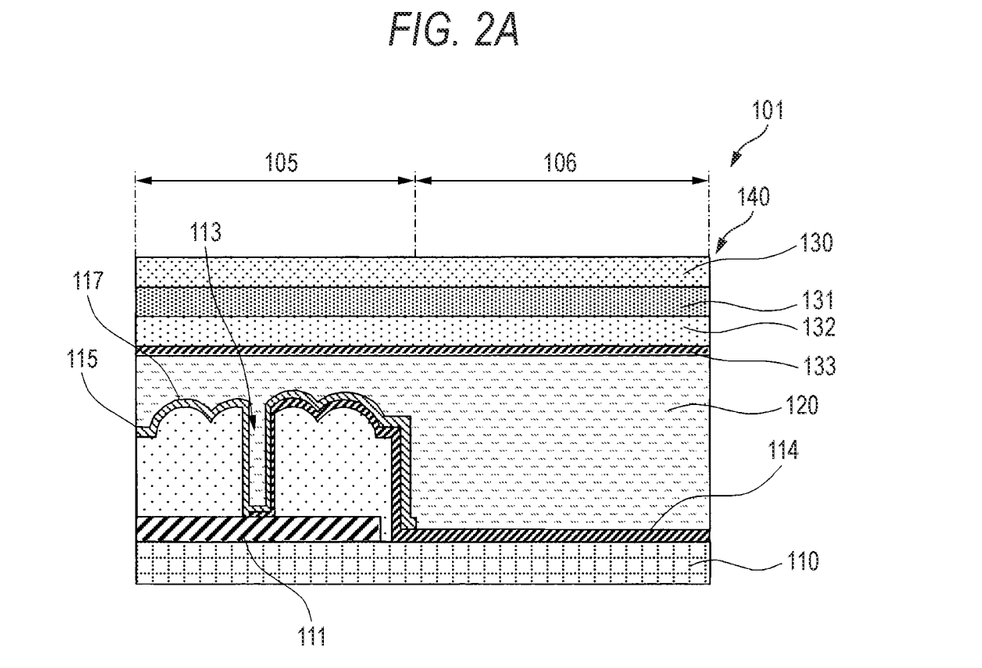
FIGS. 2A and 2B are main part sectional views showing an example of the structure of a semi-transmissive liquid crystal display device in the past as a comparative example 1.
Figure 2B:
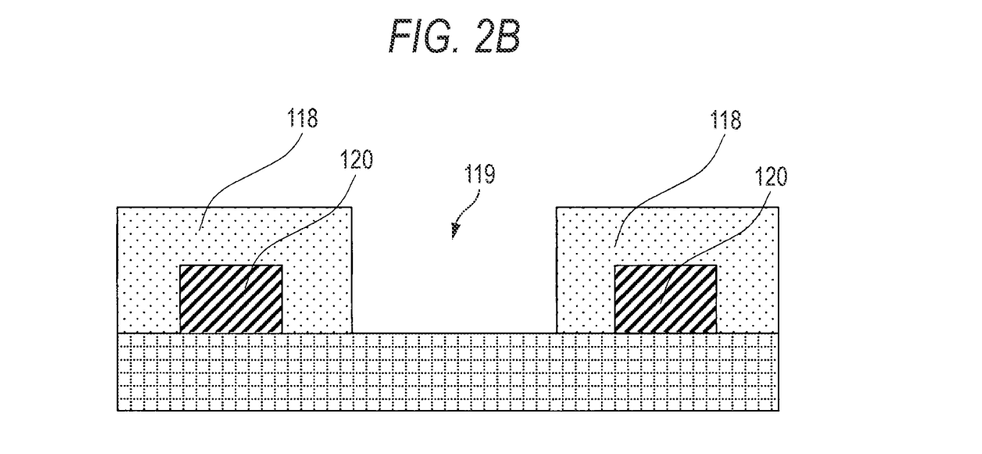

An example of the structure of a semi-transmissive liquid crystal display device in the past is explained as a comparative example 1 with reference to main part sectional views in FIGS. 2A and 2B.

As shown in FIG. 2A, a liquid crystal display device 101 is formed of plural pixels 140, in each of which a liquid crystal layer 120 is sealed between substrates 110 and 130 opposed to each other. Each of the pixels 140 has a reflective region 105 and a transmissive region 106 and displays an image. An element layer (including driving and control elements and signal lines) 111 is formed on the substrate 110. A gap adjusting layer 115 is formed to cover the element layer 111. An upper surface (on the liquid crystal layer 120 side) of the gap adjusting layer 115 is formed in an irregular shape and a contact hole 113 reaching the element layer 111 is formed in the gap adjusting layer 115. A pixel electrode 114 connected to the element layer 111 through the contact hole 113 is formed on the substrate 110. A reflection electrode 116 is formed on the gap adjusting layer 115 via the pixel electrode 114.

On the other hand, a color filter 131 is formed on the substrate 130 that is an opposed substrate opposed to the substrate 110. A pixel electrode 133 is formed on the surface of the color filter 131 via a planarizing layer 132.

In the structure in the comparative example 1, since the contact hole 113 is formed in the reflective region 105, reflection characteristics are deteriorated. As shown in FIG. 2B as a section of the transmissive region 106 in FIG. 2A, a transmission widow 119 is formed in the planarizing layer 118 to form a multi-gap. Thus, a step is formed on the planarizing layer 118 in the sections of signal lines 120 and a transmission contrast falls. When the sections of the signal lines 120 are shielded from light, a transmittance falls.

Figure 3A:
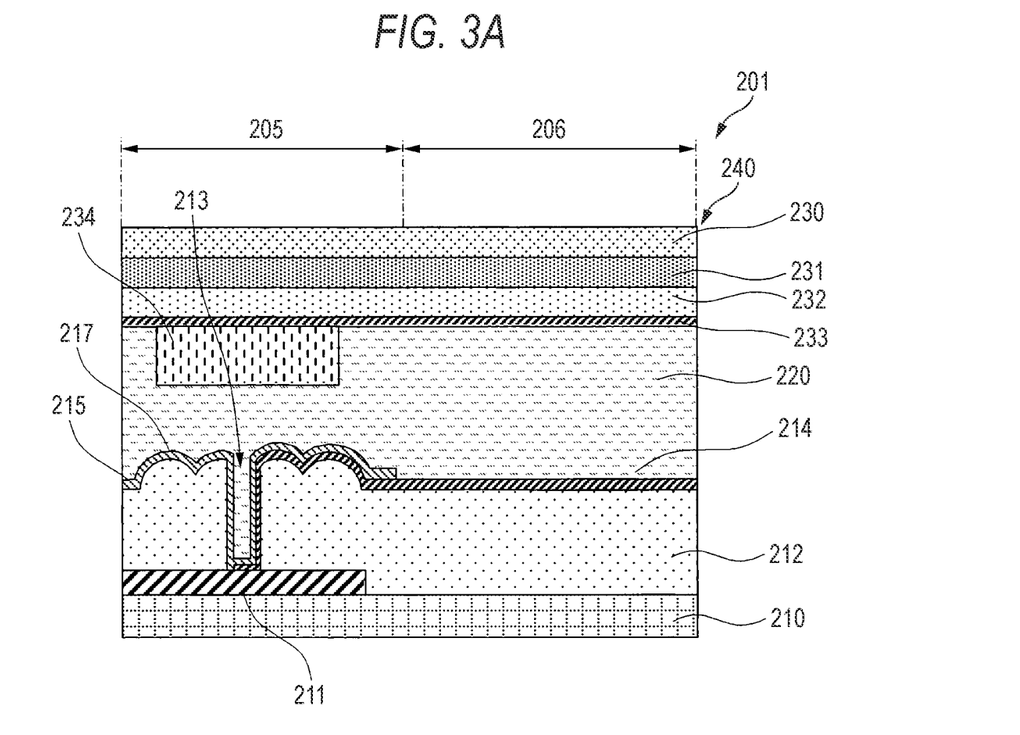
FIGS. 3A and 3B are main part sectional views showing an example of the structure of a semi-transmissive liquid crystal display device as a comparative example 2.
Figure 3B:
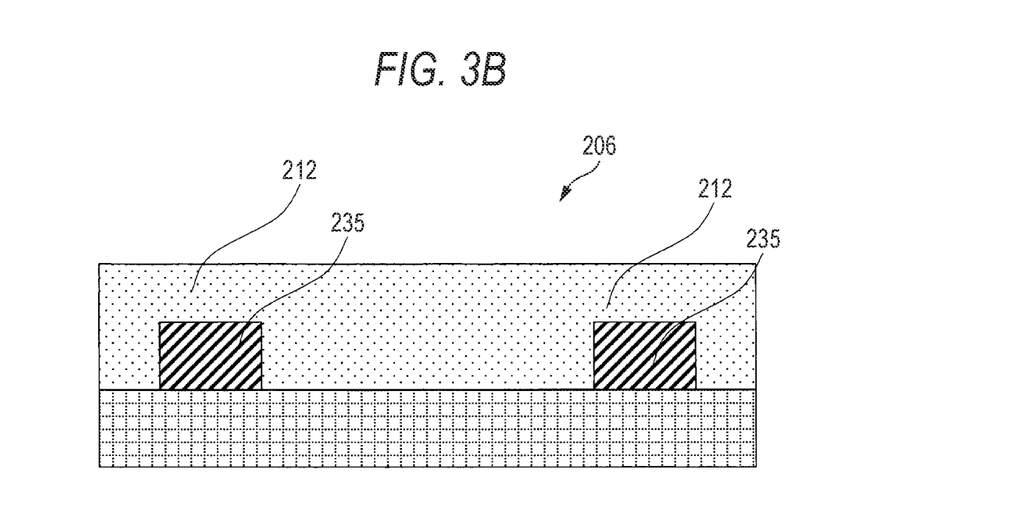

An example of the structure of a semi-transmissive liquid crystal display device is explained as a comparative example 2 with reference to main part sectional views in FIGS. 3A and 3B.

As shown in FIG. 3A, a liquid crystal display device 201 is formed of plural pixels 240, in each of which a liquid crystal layer 220 is sealed between substrates 210 and 230 opposed to each other. Each of the pixels 240 has a reflective region 205 and a transmissive region 206 and displays an image. An element layer (including driving and control elements and signal lines) 211 is formed on the substrate 210. An insulating film 212 is formed to cover the element layer 211. An upper surface (on the liquid crystal layer 220 side) of the insulating film 212 above the element layer 211 is formed in an irregular shape and a contact hole 213 reaching the element layer 211 is formed in the insulating film 212. A pixel electrode 214 connected to the element layer 211 through the contact hole 213 is formed on the substrate 210. A reflection electrode 216 is formed on the upper surface of the insulating film 212 above the element layer 211 via a part of the pixel electrode 214.

On the other hand, a color filter 231 is formed on the substrate 230 that is an opposed substrate opposed to the substrate 210. A pixel electrode 233 is formed on the surface of the color filter 231 via a planarizing layer 232. Moreover, a gap adjusting layer 234 is formed on the pixel electrode 233 opposed to the element layer 211.

In the structure in the comparative example 2, as shown in FIG. 3B, a pixel structure of the transmissive region 6 is the structure in which the planarized insulating film 212 that covers signal lines 235 on the substrate 210 is formed. Moreover, the surface of the insulating film 212 is formed flat. Thus, the structure is the same as the structure of the liquid crystal display device 1 according to this embodiment and high transmission characteristics are obtained. However, it is necessary to take into account a margin of bonding of the two substrates 210 and 230. The gap adjusting layer 234 formed on the opposed substrate (the substrate 230) side with respect to the reflective region 205 is reduced in size. Thus, a reflectance falls as definition is higher. Further, since the contact hole 213 of the reflective region 205 is necessary, reflection characteristics are deteriorated.

On the other hand, in the liquid crystal display device 1 according to this embodiment, since the pixel electrode 14 is connected to the element layer 11 through the contact hole 13 formed in the planarizing layer 12 and the gap adjusting layer 15 of the reflective region 5 is formed on the pixel electrode 14, it is unnecessary to form a contact hole in the gap adjusting layer 15. Therefore, reflection characteristics are improved. Further, since the gap adjusting layer 15 is formed on the element layer 11 side, it is unnecessary to secure a margin of bonding with the opposed side. Therefore, since the gap adjusting layer 15 of the reflective region 5 can be formed wide, high reflection characteristics are obtained.

Moreover, in the semi-transmissive liquid crystal display device having the structure in the comparative example 2, it is necessary to form roughness on the surface of the insulating film 234. Therefore, the insulating film 234 needs to have heat resistance for preventing the insulating film 234 from being reflowed to be flat in a heating process. As a result, a material of the insulating film 234 is limited. On the other hand, in the planarizing layer 12 adopted in the liquid crystal display device 1 according to this embodiment, it is unnecessary to form roughness on the surface thereof. Therefore, combination with functional materials such as a low dielectric constant material like alicyclic olefin resin or SOG and a high planarization material having low heat resistance is possible.

In the case of the semi-transmissive liquid crystal display device having the structure in the past, the insulating film 234 needs to have characteristics such as a transmittance and insulating properties. However, the gap adjusting layer 15 does not need such a characteristic. Therefore, it is possible to obtain improvement of functions such as improvement of productivity, high reliability, and a low dielectric constant by adopting a high sensitivity material, a high planarization material, and the like.

Optical characteristics of the semi-transmissive liquid crystal display device according to this embodiment and the semi-transmissive liquid crystal display device having the structure in the past (the comparative example 2) were compared. A result of the comparison is shown in Table 1.

TABLE 1

| | | Pixels in the past | Embodiment |
|---|---|---|---|
| Transmission characteristics | Transmittance (%) | 3.4 | 3.5 |
| | Transmission contrast ratio | 103 | 100 |
| Reflection characteristics | Reflectance (%) | 1.9 | 3 |
| | Reflection contrast ratio | 2.9 | 8.4 |

As shown in Table 1, the transmission characteristics were substantially the same in the liquid crystal display device 201 having the structure in the past (the comparative example 2) and the liquid crystal display device 1 according to this embodiment. On the other hand, concerning the reflection characteristics, the reflectance was 1.9% in the liquid crystal display device 201 in the comparative example 2 and the reflectance was 3% in the liquid crystal display device 1 according to this embodiment. As a result, in the liquid crystal display device 1 according to this embodiment, the reflectance was 1.5 times as high as that of the liquid crystal display device 201 in the comparative example 2. This is because a contact hole was not formed in the gap adjusting layer 15 and, since there was no assembly margin, a reflection area was increased. Moreover, a reflection contrast ratio was extremely low in the liquid crystal display device 201 in the comparative example 2 because of light leakage due to the influence of a step in a bonding deviation portion and because of the contact hole. On the other hand, in the liquid crystal display device 1 according to this embodiment, a reflection contrast ratio was about three times as high as that of the liquid crystal display device 201.

As described above, since the reflective region 5 includes the gap adjusting layer 15 in which the reflection electrode 16 is formed, the reflective region 5 can suppress deterioration in reflection characteristics. Therefore, a high reflectance can be obtained. The transmissive region 6 is formed by the area including the planarizing layer 12 formed on the substrate 10. The element layer 11 in which the driving transistor, the signal lines, and the like are formed is provided in the reflective region 5. Therefore, since there are no items that block the transmission of light in the transmissive region 6, it is possible to realize a high transmission contrast ratio and a high transmittance.

A method of manufacturing a liquid crystal display device according to the first embodiment is explained with reference to manufacturing process sectional views in FIGS. 4A to 4C and FIGS. 5A and 5B. FIGS. 4A to 4C and FIGS. 5A and 5B show a semi-transmissive liquid crystal display device as an example of the liquid crystal display device.

Figure 4A:
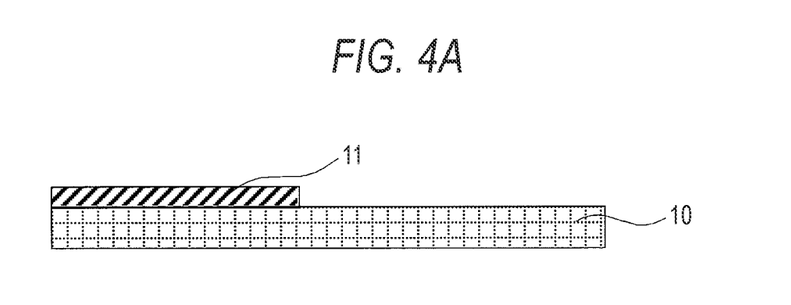
FIGS. 4A to 4C are manufacturing process sectional views showing a method of manufacturing a liquid crystal display device according to the first embodiment.

As shown in FIG. 4A, the element layer 11 made of a TFT or the like and including a switching element, an auxiliary storage capacitor, a gate line, and a signal line is formed on the substrate (first substrate) 10.

Figure 4B:
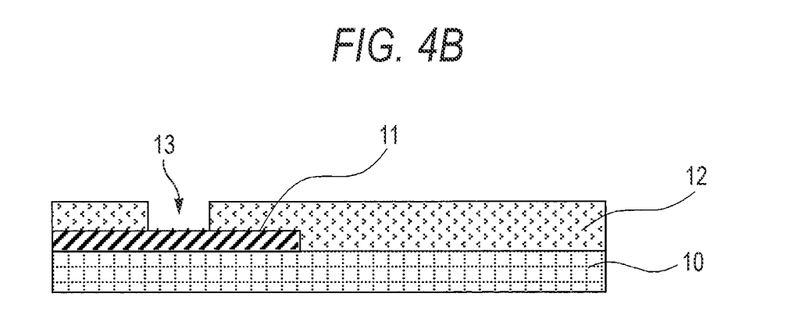

As shown in FIG. 4B, in order to planarize roughness due to the element layer 11 and the signal lines (not shown), the planarizing layer 12 is formed on the substrate 10. The contact hole 13 leading to the element layer 11 is formed on the planarizing layer 12. A transparent resist can be used for the planarizing layer 12. As such a resist, for example, there is PC315G manufactured by JSR Corporation. Alternatively, an acrylic organic film, alicyclic olefin resin, SOG, and the like can be used.

Figure 4C:
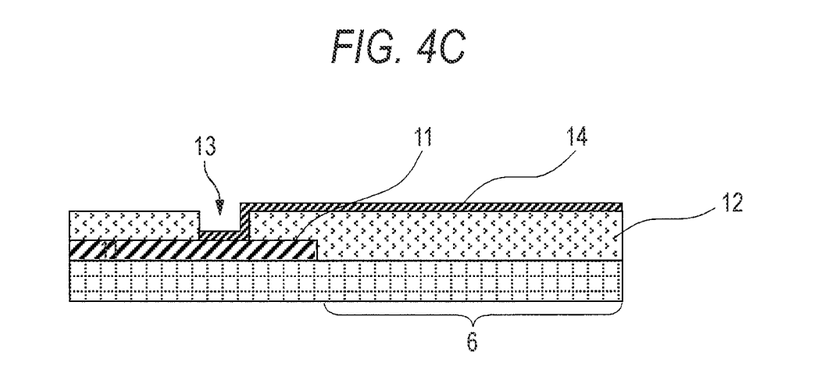

As shown in FIG. 4C, the pixel electrode 14 connected to the element layer 11 through the contact hole 13 is formed on the planarizing layer 12 as an electrode of the transmissive region 6. The pixel electrode 14 is formed by, for example, a transparent electrode of indium tin oxide (ITO) or the like.

Figure 5A:
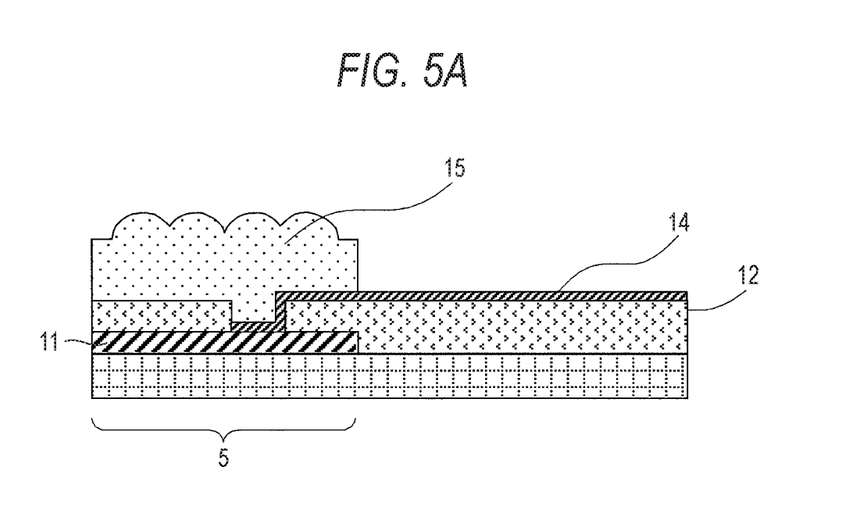
FIGS. 5A and 5B are manufacturing process sectional views showing the method of manufacturing a liquid crystal display device according to the first embodiment.

As shown in FIG. 5A, the gap adjusting layer 15 is formed on the planarizing layer 12 above the element layer 11 of the reflective region 5. Since the pixel electrode 14 connected to the element layer 11 is formed earlier and, then, the gap adjusting layer 15 is formed in this way, a contact hole leading to the element layer 11 is prevented from being formed in the gap adjusting layer 15. Therefore, excellent reflection characteristics are obtained.

When the gap adjusting layer 15 is formed, the gap adjusting layer 15 is exposed with an exposure amount that can expose only a surface layer of the gap adjusting layer 15 and developed to form roughness on the upper surface of the gap adjusting layer 15 and, then, baking of the gap adjusting layer 15 is performed. Therefore, the roughness are formed in a rounded shape. This baking is performed at, for example, 220° C.

Figure 5B:
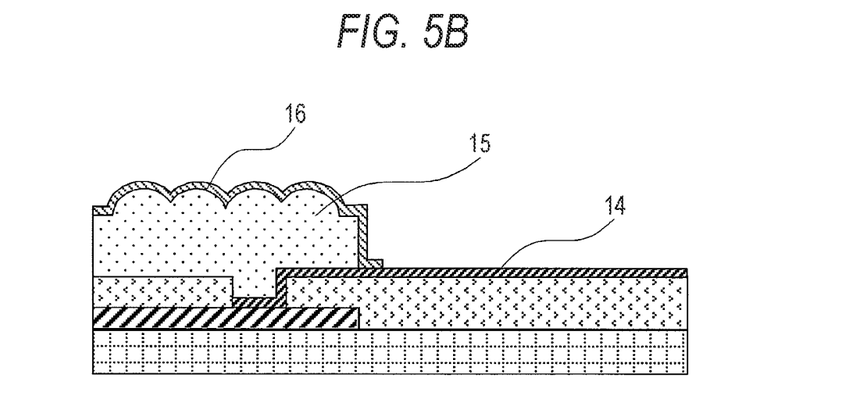

Thereafter, as shown in FIG. 5B, the reflection electrode 16 connected to the pixel electrode 14 at an end of the gap adjusting layer 15 is formed on the gap adjusting layer 15. The reflection electrode 16 is formed of, for example, a metal material having a high reflectance. The metal material is, for example, silver (Ag), aluminum (Al), or the like. Since the upper surface of the gap adjusting layer 15 is formed in the shape of the rounded roughness and the reflection electrode 16 is formed on the surface thereof in this way, it is possible to improve the reflection characteristics of the reflective region 5.

As a process after that, an orientation film is formed, substrates are bonded together using a seal material via a color filter in which a spacer is formed or via a spacer, and liquid crystal is injected between the substrates to complete a liquid crystal cell. A phase difference plate and a sheet polarizer are bonded to this liquid crystal cell to manufacture the semi-transmissive liquid crystal display device according to this embodiment.

According to the method of manufacturing a liquid crystal display device according to the first embodiment, since the reflective region 5 can suppress deterioration in the reflection characteristics, it is possible to realize a liquid crystal display device having a high reflectance. Since the surface of the transmissive region 6 is planarized by the planarizing layer 12, it is possible to realize a liquid crystal display device having a high transmission contrast ratio and a high reflectance. Since the reflection electrode 16 is connected to the pixel electrode 14 at one end of the gap adjusting layer 15, a contact hole connecting the reflection electrode 16 and the pixel electrode 14 is unnecessary. Therefore, it is possible to realize a liquid crystal display device excellent in reflection characteristics such as a reflectance and a contrast. Moreover, since the gap adjusting layer 15 is formed on the side where the element layer 11 is formed, a step is formed on the element layer 11 side. Therefore, a margin of bonding with the color filter is unnecessary. Consequently, when the transmittance is the same, it is possible to form a display device excellent in the reflection characteristics compared with the display device having the gap adjusting layer on the color filter side.

Figure 6A:
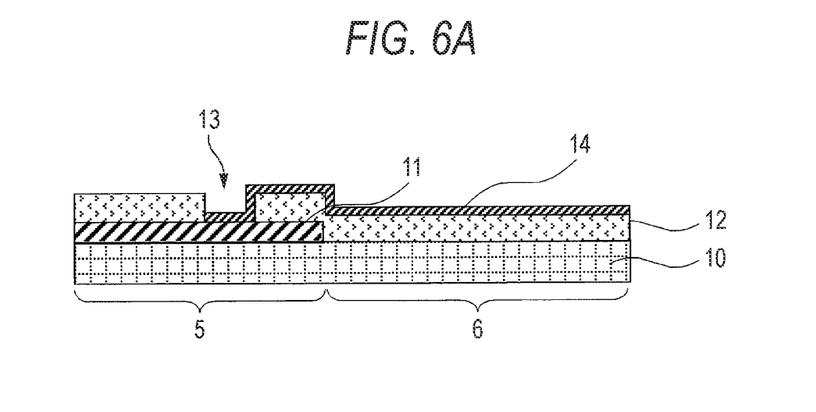
FIGS. 6A to 6C are manufacturing process sectional views showing a method of manufacturing a liquid crystal display device according to a second embodiment of the present invention.
Figure 6B:
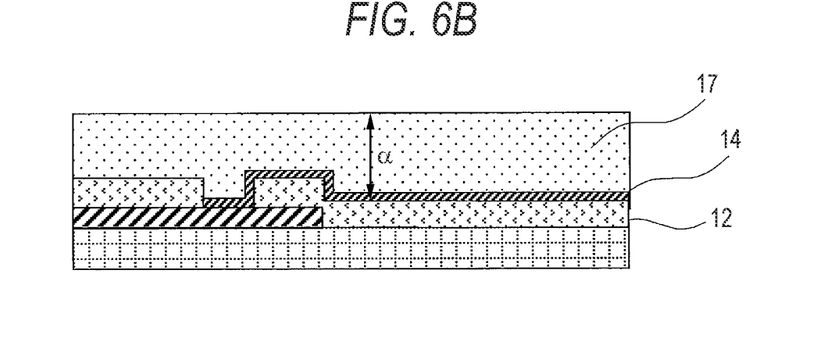
Figure 6C:
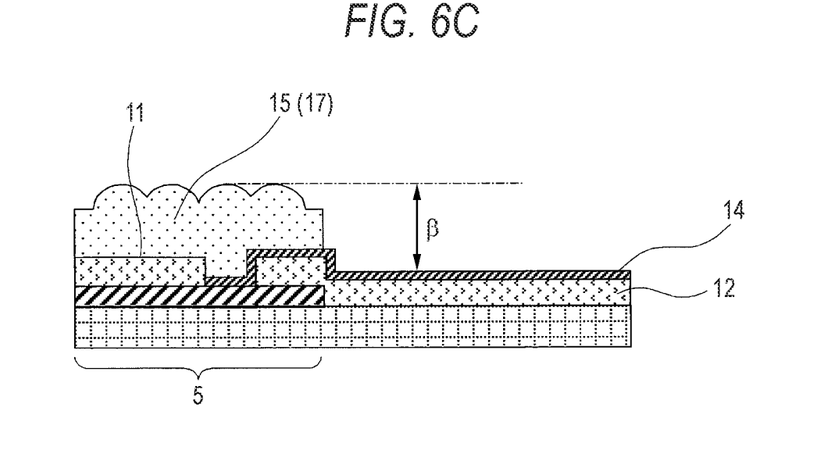

In the method of manufacturing a liquid crystal display device according to the first embodiment, depending on a material forming the gap adjusting layer 15, an exposure amount may be large to hinder productivity. When the thickness of a film forming the gap adjusting layer 15 is large, since reflow of the gap adjusting layer 15 increases, formation of roughness necessary for obtaining satisfactory reflection characteristics is hindered. Therefore, a method of manufacturing a liquid crystal display device for reducing the thickness of the gap adjusting layer 15 is provided. An example of the method of manufacturing a liquid crystal display device is explained with reference to manufacturing process sectional views in FIGS. 6A to 6C as a method of manufacturing a liquid crystal display device according to a second embodiment of the present invention. FIGS. 6A to 6C show a semi-transmissive liquid crystal display device as an example of the liquid crystal display device.

As shown in FIG. 6A, the element layer 11 made of a TFT or the like and including switching elements, auxiliary storage capacitance lines, gate lines, and signal lines is formed on the substrate (first substrate) 10. Subsequently, the planarizing layer 12 is formed on the substrate 10 in order to planarize roughness due to the element layer 11 and the signal lines (not shown). The planarizing layer 12 is formed flat in the reflective region 5 and the transmissive region 6 and has a step at an end of the element layer 11. In other words, the planarizing layer 12 is formed such that the height from the surface of the substrate 10 to the surface of the planarizing layer 12 in an area in which a gap adjustment layer is formed is larger than the height to the surface of the planarizing layer 12 in an area in which the gap adjusting layer is not formed. The contact hole 13 leading to the element layer 11 is formed in the planarizing layer 12. A transparent resist can be used for the planarizing layer 12. As such a resist, for example, there is PC315G manufactured by JSR Corporation. Alternatively, an acrylic organic film, alicyclic olefin resin, SOG, and the like can be used.

The pixel electrode 14 connected to the element layer 11 through the contact hole 13 is formed on the planarizing layer 12 as an electrode of the transmissive region 6. The pixel electrode 14 is formed by, for example, a transparent electrode of indium tin oxide (ITO) or the like.

As shown in FIG. 6B, an insulating film 17 having a flat surface is formed on the planarizing layer 12 via the pixel electrode 14.

As shown in FIG. 6C, the gap adjusting layer 15 formed of the insulating film 17 is formed on the planarizing layer 12 on the element layer 11 of the reflective region 5 by a lithography technique and an etching technique or, when the insulating film 17 is a photosensitive film, by a lithography technique (exposure, development, etc.). The pixel electrode 14 connected to the element layer 11 is formed earlier and, then, the gap adjusting layer 15 is formed in this way. Therefore, a contact hole leading to the element layer 11 is prevented from being formed in the gap adjusting layer 15 and excellent reflection characteristics are obtained.

When the gap adjusting layer 15 is formed, the gap adjusting layer 15 is exposed with an exposure amount that can expose only a surface layer of the gap adjusting layer 15 (e.g., an exposure amount smaller than an exposure amount for forming a contact hole) and developed to form roughness on the upper surface of the gap adjusting layer 15 and, then, baking of the gap adjusting layer 15 is performed. Therefore, the rough upper surface has a rounded shape formed on it. This baking is performed at, for example, 220° C.

As explained above, the planarized surface of the insulating film 17 is exposed with an exposure amount smaller than an exposure amount for forming a contact hole and developed to form a step. In this case, it is possible to form, with a small exposure amount, application thickness α of the insulating film 17 for forming the gap insulating film 15 because the height β of the gap adjusting layer 15, which is a step for obtaining an appropriate gap, is reduce simultaneously with the formation of the application thickness α.

Figure 7:
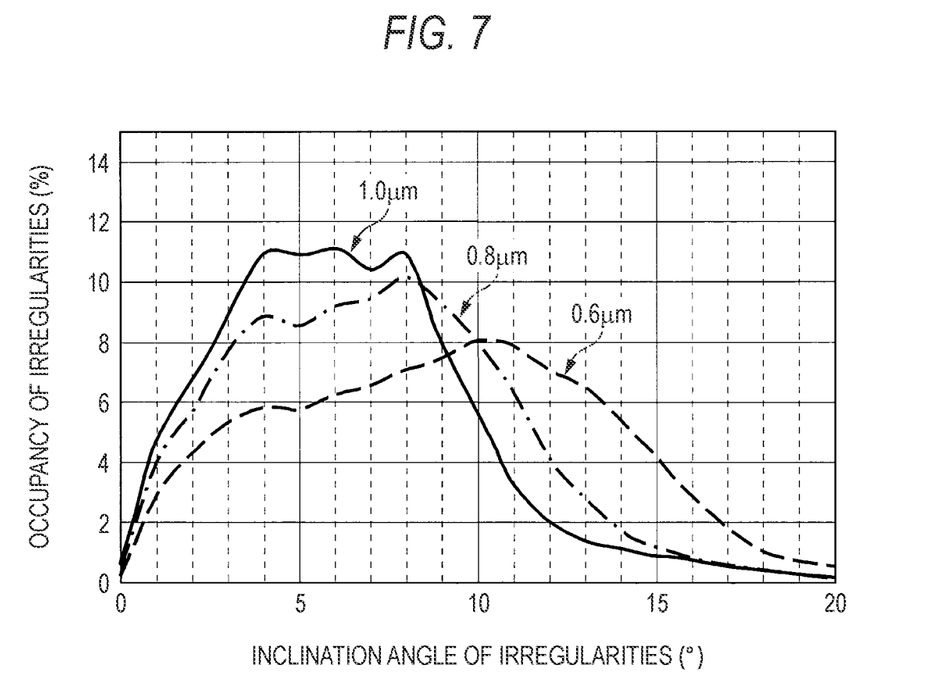
FIG. 7 is a graph of a relation between the occupancy of roughness and an inclination angle of the roughness.

Consequently, since reflow of a material forming the roughness is also controlled, as shown in a graph showing a relation between an excavation amount of a transmissive region of a planarizing layer and an inclination angle of roughness, the inclination angle of roughness can be controlled by the excavation amount. Therefore, it is possible to manufacture a liquid crystal display device having reflection characteristics optimum for the device.

Figure 8:
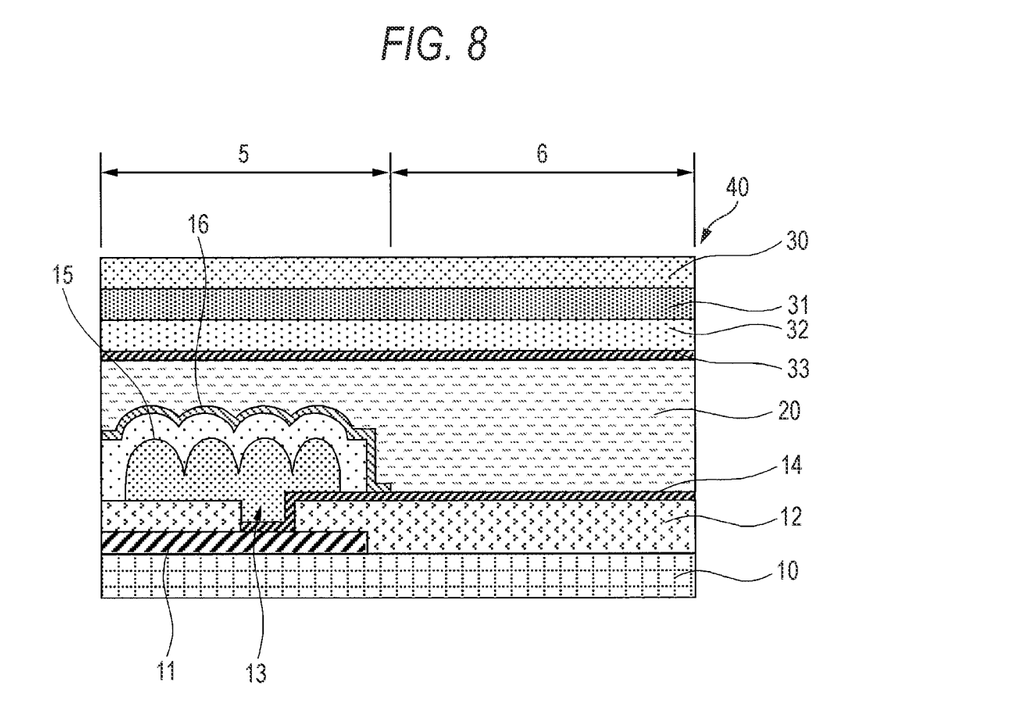
FIG. 8 is a main part sectional view showing a liquid crystal display device according to the second embodiment.

A liquid crystal display device according to the second embodiment is explained with reference to a main part sectional view in FIG. 8. FIG. 8 shows a semi-transmissive liquid crystal display device as an example of the liquid crystal display device.

As shown in FIG. 8, the liquid crystal display device 1 is formed by the plural pixels 40, in each of which the liquid crystal layer 20 is sealed between the substrates 10 and 30 opposed to each other. Each of the pixels 40 has the reflective region 5 and the transmissive region 6 and displays an image. The element layer (including driving and control elements and signal lines) 11 is formed on the substrate 10. The planarizing layer 12 is formed on the substrate 10 to cover the element layer 11. The pixel electrode 14 connected to the element layer 11 through the contact hole 13 is formed on the planarizing layer 12 on the element layer 11. The gap adjusting layer 15 is formed on the pixel electrode 14 and above the element layer 11. The gap adjusting layer 15 is formed by, for example, two layers of organic insulating films. An upper surface (on the liquid crystal layer 20 side) of the gap adjusting layer 15 is formed in an irregular shape and the reflection electrode 16 is formed thereon. The reflection electrode 16 is connected to the pixel electrode 14 at an end of the gap adjusting layer 15.

Therefore, the reflective region 5 is formed by an area including the element layer 11, the planarizing layer 12 that covers the element layer 11, the gap adjusting layer 15 formed on the planarizing layer 12 via a part of the pixel electrode 14, and the reflection electrode 16 formed on the gap adjusting layer 15. The transmissive region 6 is formed by an area including the planarizing layer 12 and the pixel electrode 14 formed on the substrate 10 excluding an area in which the gap adjusting layer 15 is formed.

On the other hand, the color filter 31 is formed on the substrate 30 that is an opposed substrate opposed to the substrate 10. The pixel electrode 33 is formed on the surface of the color filter 31 via the planarizing layer 32.

In the pixels in the past, there are the roughness due to the contact hole and the signal lines in the pixels in the reflection area and it is difficult to continuously arrange the roughness for obtaining satisfactory reflection characteristics. However, according to this embodiment, since it is possible to continuously arrange pixels including roughness, a display element having satisfactory reflection characteristics is obtained. A flat area is indispensable for stabilization of a gap in a photospacer. Since a continuous rough surface is obtained and the heights associated with the rough surface are uniform, it is possible to arrange the photo-spacer on the rough surface.

Figure 9:
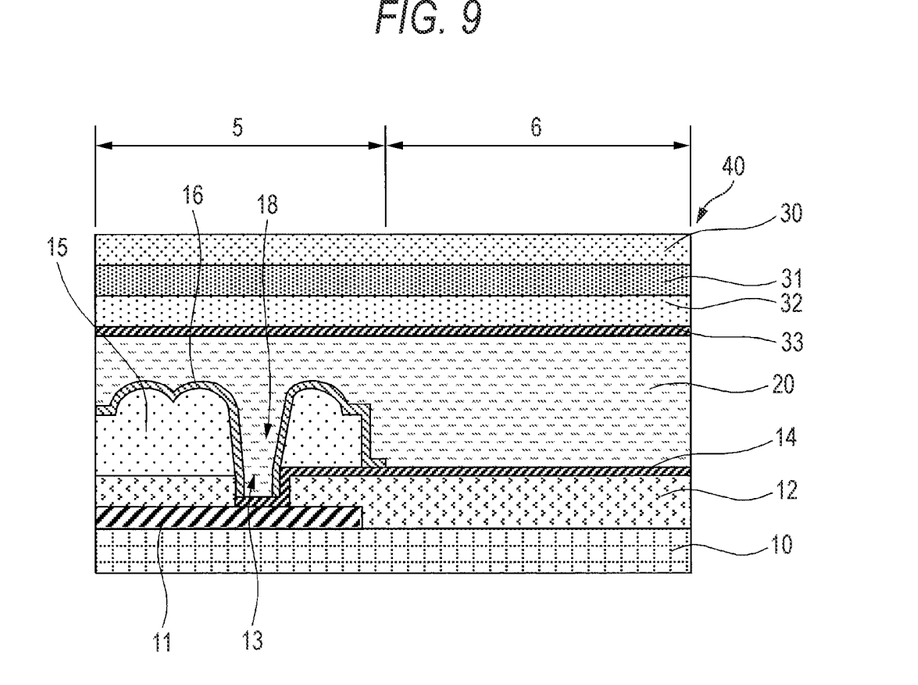
FIG. 9 is a main part sectional view showing a liquid crystal display device according to a third embodiment of the present invention.

A liquid crystal display device according to a third embodiment of the present invention is explained with reference to a main part sectional view in FIG. 9. FIG. 9 shows a semi-transmissive liquid crystal display device as an example of the liquid crystal display device.

As shown in FIG. 9, the liquid crystal display device 1 is formed by the plural pixels 40, in each of which the liquid crystal layer 20 is sealed between the substrates 10 and 30 opposed to each other. Each of the pixels 40 has the reflective region 5 and the transmissive region 6 and displays an image. The element layer (including driving and control elements and signal lines) 11 is formed on the substrate 10. The planarizing layer 12 is formed on the substrate 10 to cover the element layer 11. The pixel electrode 14 connected to the element layer 11 through the contact hole 13 is formed on the planarizing layer 12 on the element layer 11. The gap adjusting layer 15 is formed on the pixel electrode 14 and above the element layer 11. An upper surface (on the liquid crystal layer 20 side) of the gap adjusting layer 15 is formed in an irregular shape. A contact hole 18 leading to the contact hole 13 is formed in the gap adjusting layer 15. The reflection electrode 16 connected to the pixel electrode 14 through the contact hole 18 is formed on the surface of the gap adjusting layer 15. The reflection electrode 16 is connected to the pixel electrode 14 at an end of the gap adjusting layer 15.

Therefore, the reflective region 5 is formed by an area including the element layer 11, the planarizing layer 12 that covers the element layer 11, the gap adjusting layer 15 formed on the planarizing layer 12 via a part of the pixel electrode 14, and the reflection electrode 16 formed on the gap adjusting layer 15. The transmissive region 6 is formed by an area including the planarizing layer 12 and the pixel electrode 14 formed on the substrate 10 excluding an area in which the gap adjusting layer 15 is formed.

On the other hand, the color filter 31 is formed on the substrate 30 that is an opposed substrate opposed to the substrate 10. The pixel electrode 33 is formed on the surface of the color filter 31 via the planarizing layer 32.

Figure 10:
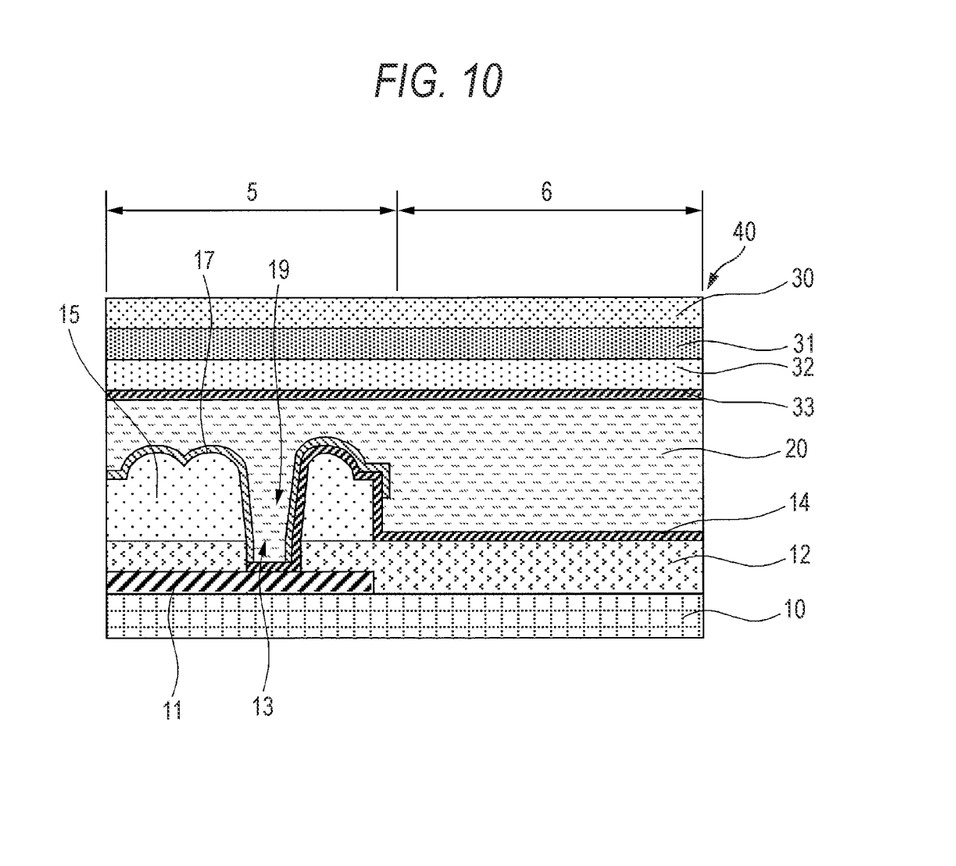
FIG. 10 is a main part sectional view showing a liquid crystal display device according to a fourth embodiment of the present invention.

A liquid crystal display device according to a fourth embodiment of the present invention is explained with reference to a main part sectional view in FIG. 10. FIG. 10 shows a semi-transmissive liquid crystal display device as an example of the liquid crystal display device.

As shown in FIG. 10, the liquid crystal display device 1 is formed by the plural pixels 40, in each of which the liquid crystal layer 20 is sealed between the substrates 10 and 30 opposed to each other. Each of the pixels 40 has the reflective region 5 and the transmissive region 6 and displays an image. The element layer (including driving and control elements and signal lines) 11 is formed on the substrate 10. The planarizing layer 12 is formed on the substrate 10 to cover the element layer 11. The gap adjusting layer 15 is formed on the planarizing layer 12 on the element layer 11 and above the element layer 11. An upper surface (on the liquid crystal layer 20 side) of the gap adjusting layer 15 is formed in an irregular shape. A contact hole 19 leading to the element layer 11 piercing through the planarizing layer 12 is formed in the gap adjusting layer 15. The pixel electrode 14 connected to the element layer 11 through the contact hole 19 is formed on the surface of the gap adjusting layer 15. The reflection electrode 16 is formed on the pixel electrode 14 in an area of the gap adjusting layer 15.

Therefore, the reflective region 5 is formed by an area including the element layer 11, the planarizing layer 12 that covers the element layer 11, the gap adjusting layer 15, apart of the pixel electrode 14 connected to the element layer 11 piercing through the gap adjusting layer 15 and the planarizing layer 12, and the reflection electrode 16 formed on the gap adjusting layer 15. The transmissive region 6 is formed by an area including the planarizing layer 12 and the pixel electrode 14 formed on the substrate 10 excluding an area in which the gap adjusting layer 15 is formed.

On the other hand, the color filter 31 is formed on the substrate 30 that is an opposed substrate opposed to the substrate 10. The pixel electrode 33 is formed on the surface of the color filter 31 via the planarizing layer 32.

In the respective embodiments, the roughness formed on the upper surface of the gap adjusting layer 15 may be continuously formed among the pixels. A photo-spacer can be arranged on the surface of the roughness.

As in the liquid crystal display device in the past, since it is difficult to increase a transmission contrast in the roughness of the signal lines when there is the step on the element layer 11 side. Thus, if it is attempted to substantially block light and improve the contrast, a transmittance falls. On the other hand, in the liquid crystal display devices according to the embodiments, since the signal lines are embedded in the planarizing layer 12, a display panel excellent in transmission characteristics can be obtained. In the past, the insulating film for roughness forming the reflection electrode is limited to an insulating film having reflection characteristics made of acrylic resin or the like. However, it is possible to select materials having various characteristics such as a low dielectric constant material like SOG or alicyclic olefin resin.

In the respective embodiments, the liquid crystal display device is explained as an example of the display device. However, it is also possible to obtain characteristics such as an improved function and an improved aperture by using the present invention in a display device such as an organic electroluminescence device in which a pixel electrode has a contact hole (a connecting section) connected to an element layer.

It should be understood by those skilled in the art that various modifications, combinations, sub-combinations, and alterations may occur depending on design requirements and other factors insofar as they are within the scope of the appended claims or the equivalents thereof.

What is claimed is:

1. A method of manufacturing a display device comprising:
   forming, on a substrate, a planarizing layer that covers an element layer formed on the substrate;
   forming, in the planarizing layer, a contact hole leading to the element layer;
   forming, on the planarizing layer, a pixel electrode connected to the element layer through the contact hole;
   forming a gap adjusting layer over the planarizing layer; and
   forming, on the gap adjusting layer, a reflection electrode connected to the pixel electrode at one end of the gap adjusting layer,
   wherein,
      the pixel electrode has a portion that is between the planarizing layer and the gap adjusting layer with respect to a thickness direction of the display device, and
      the planarizing layer is formed such that a height from a surface of the substrate to a surface of the planarizing layer in an area in which the gap adjusting layer is formed is larger than a height from the surface of the substrate to a surface of the planarizing layer in an area in which the gap adjusting layer is not formed.

2. The method of manufacturing a display device according to claim 1, further comprising the step of forming roughness on the gap adjusting layer after forming the gap adjusting layer and before forming the reflection electrode.

* * * * *